March 22, 1960   M. J. CZERENDA   2,929,635
EXPANDIBLE COLLET ARBOR
Filed Aug. 11, 1958
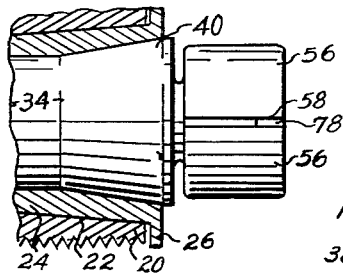
FIG.3.
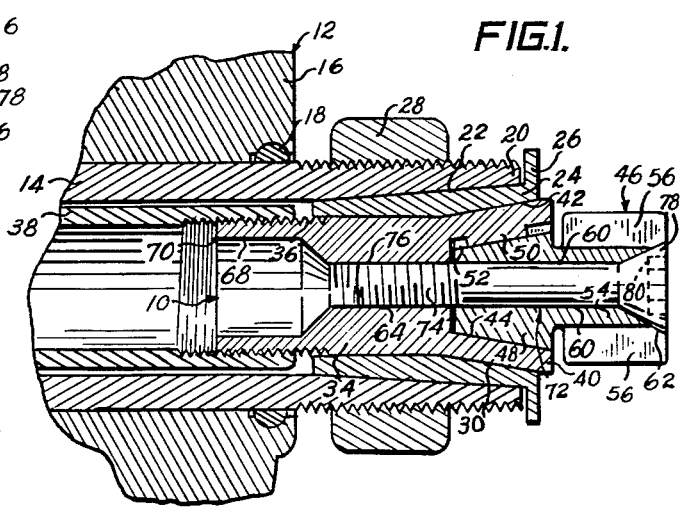
FIG.1.
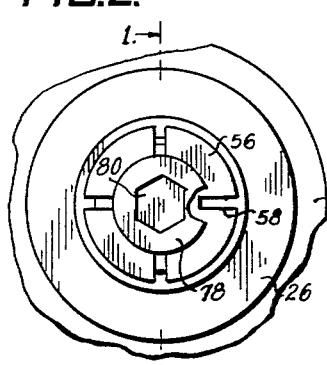
FIG.2.
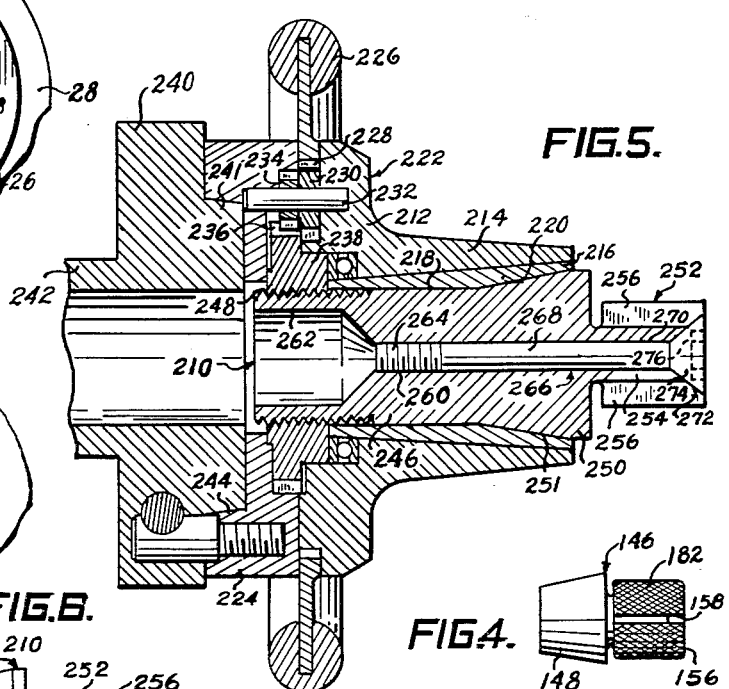
FIG.5.
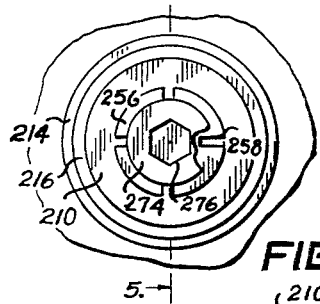
FIG.6.
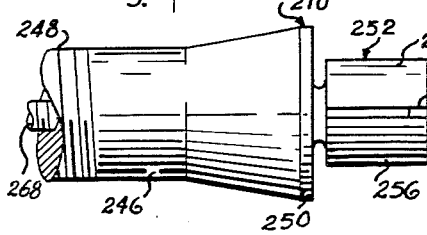
FIG.7.
FIG.4.
INVENTOR.
Michael J. Czerenda
BY
ATTORNEY.

United States Patent Office 2,929,635
Patented Mar. 22, 1960

2,929,635

EXPANDIBLE COLLET ARBOR

Michael J. Czerenda, Kansas City, Mo.

Application August 11, 1958, Serial No. 754,205

6 Claims. (Cl. 279—2)

This invention relates generally to the field of machine tools and more specifically, to an improved collet arbor adapted to be mounted on a chuck therefor rotatably carried by the machine and with the workpiece disposed in very accurate, coaxial alignment with the spindle of the machine tool rotatably driving the chuck and thereby the arbor.

It is the most important object of the invention to provide a collet arbor adapted for mounting on a chuck attached to a spindle of a machine tool such as a lathe, with the arbor being constructed in a novel manner to maintain workpieces having an aperture therethrough in precision coaxial alignment with the lathe spindle throughout the time that such workpiece is being machined.

Also an object of the invention is to provide an arbor as referred to above, having an expandible collet adapted to engage the workpiece within the aperture therein in a manner to firmly and securely hold such workpiece in predetermined coaxial relationship to the spindle of the lathe or other machine tool, with the expandible, work-engaging collet portion of the arbor being replaceable with various sizes of collets to permit the arbor to be utilized in the mounting of workpieces having apertures of different sizes therein on the machine tool spindle.

A further important object of the invention is to provide an arbor having an expandible, work-engaging collet portion and which arbor is adapted to be utilized in conjunction with different types of collet chucks secured to the spindle, and particularly chucks including structure forming a part thereof for engaging the arbor as well as lathes of the type wherein a drawbar is utilized in conjunction with the chuck to maintain the arbor in its correct position in axial alignment with the machine spindle.

Another very important object is to provide an arbor for holding workpieces during machining of the latter, wherein all surfaces of the arbor in interengagement with the chuck therefor are substantially conical to thereby assure precision coaxial alignment of the aperture in the workpiece with the spindle by virtue of the tapered fit between all of the components.

A similar important object is to provide an expandible collet arbor wherein the work-engaging collet portion thereof and which may be removed from the main body portion of the arbor to permit collets of various sizes to be employed to hold the workpiece, has a tapered surface engaging a complemental, conical surface on the main body portion to provide precision alignment of the aperture in the workpiece with the axis of the spindle upon interchange of the expandible collets and without measurements and adjustment being necessary to bring the parts into correct alignment.

Other important objects of the invention relate to the provision of an arbor having an expandible collet engageable with a workpiece within an aperture therein, wherein the main body portion of the arbor is externally threaded to permit a conventional drawbar or rotatable threaded sleeve within a collet chuck to be employed to maintain the arbor in correct position in coaxial alignment with the spindle of the machine tool; to an expandible collet arbor wherein the cylindrical surface of the collet portion adapted to engage the workpiece within the aperture therein, is serrated to assure firm joinder of the collet to the workpiece; to an arbor as defined wherein the removable, work-engaging, expandible collet joined to the main body portion of the arbor is keyed to the latter to prevent relative rotation between the collet portion and the main body portion; to an expandible collet arbor having interchangeable, work-engaging collet portions enabling the arbor to be utilized for holding workpieces of various internal diameters and lengths, and the arbor being of relatively simple structure, easily assembled and disassembled, and of component parts permitting the same to be marketed at a practical unit price; and to other important objects and details of construction of the instant device which will become obvious or be explained more fully as the following specification progresses.

In the drawing:

Figure 1 is a longitudinal, cross-sectional view illustrating one embodiment of the present expandible collet arbor mounted in operable position within a chuck therefor, in turn secured to the rotatable spindle of a machine tool or the like;

Fig. 2 is a fragmentary, front elevational view of the assembly illustrated in Fig. 1;

Fig. 3 is a fragmentary, cross-sectional view similar to Fig. 1 and illustrating the present expandible collet arbor in elevation;

Fig. 4 is a reduced, elevational view of a modified form of one of the expandible collet units adapted to be interchangeably mounted on the main body portion of the arbor;

Fig. 5 is a longitudinal, cross-sectional view similar to Fig. 1 and showing a modified form of expandible collet arbor mounted in operable position within another type of collet chuck adapted to be mounted on the spindle of a machine tool;

Fig. 6 is a fragmentary, front elevational view of the unit shown in Fig. 5; and Fig. 7 is a fragmentary, elevational view of the expandible collet arbor shown in Fig. 5.

Briefly, the present invention comprises an expandible collet arbor adapted to be mounted within a collet chuck suitably secured to the rotatable spindle of a machine tool in the nature of a lathe or the like, and which arbor is adapted for engaging a workpiece within an aperture therein for maintaining the aperture in accurate coaxial alignment with the spindle of the lathe throughout the time that the workpiece is being machined. The present arbor is adapted for placement on various types of collet chucks and may be in one of two forms with one of the embodiments having interchangeable, work-engaging collet assemblies whereby workpieces having apertures therein of differing diameters may be advantageously held for machining purposes. The instant arbor has improved expander means telescoped within the arbor and engaging the collet portion of the same for spreading the individual sections of the collet into firm engagement with the workpiece within the aperture therein, to assure accurate coaxial alignment of such aperture with the axis of the spindle.

An arbor broadly designated 10 and embodying one principle of the instant invention is illustrated in Figs. 1 to 3 inclusive and is adapted to be mounted on a machine tool generally indicated 12 and which is provided with a normally horizontal, rotatable, tubular spindle 14 carried by the headstock 16 of machine tool 12, with a number of circumferential lubrication seals 18, one of which is illustrated, on spindle 14 and adapted for preventing loss of lubricant from the bearings surrounding spindle 14. The end 20 of spindle 14 extending outwardly from headstock 16 is externally threaded and has an inner, frustoconical surface 22 with the largest diameter thereof at the outer peripheral edge of spindle 14. A tubular sleeve 24, telescoped within spindle 14, has an outer surface complementally and frictionally engaging surface 22 of spindle 14. Outer flange 26 of sleeve 24 is normally in close proximity to the outer end edge of spindle 14 and a nut 28 threaded over end 20 moves into engagement with flange 26 when rotated in a direction to be removed from spindle 14 to thereby facilitate removal of sleeve 24 from spindle 14. Sleeve 24 also has an internal conical surface 30 extending only partially of the longitudinal length thereof.

Arbor 10 is telescoped within sleeve 24 and thereby spindle 14 with tubular, elongated, main body portion 34 thereof extending into the portion of spindle 14 carried by headstock 16. As best shown in Fig. 1, the normally innermost, outer cylindrical surface of main body portion 34 is externally threaded as at 36 and is adapted to be threaded into tubular drawbar 38 telescoped within spindle 14 and extending outwardly from headstock 16 through the opposite end thereof from end 20 of spindle 14. It can be recognized that arbor 10 may be removed from sleeve 24 and spindle 14 by turning drawbar 38 in a direction to unscrew the inner end thereof from threads 36 on main body portion 34 of arbor 10.

A substantially frusto-conical member 40 integral with main body portion 34 is coaxial with the latter and has an outer conical surface 42 complementally engageable with conical surface 30 in sleeve 24. Also, member 40 has a frusto-conical recess 44 which is in turn concentric with sleeve 24 and tubular spindle 14.

An expandible collet generally designated 46 is removably secured to member 40, with frusto-conical head portion 48 thereof disposed within and complementally received by member 40. A longitudinally extending key 50 integral with member 40 and extending into recess 44 is slidably received within a keyway 52 in the outer conical surface of frusto-conical head portion 48 to thereby prevent relative rotation of head portion 48 with respect to main body portion 34.

The work-engaging portion of collet 46 includes a central element 54 integral with head portion 48 and concentric therewith, as well as a number of radially extending, semicylindrical sections 56 integral with and projecting from element 54 and separated by slots 58 therebetween. It is to be understood that the work engaging portion of collet 46 may be constructed by providing a cylindrical component integral with head 48 and cutting radially extending slots 58 in such component to present circumferentially spaced sections 56.

An elongated bore 60 through collet 46 and concentric with the described conical surfaces as well as tubular spindle 14, communicates with a conical segment 62 in element 54 and the outermost ends of respective sections 56. The normally innermost end of bore 60 aligns with an elongated, internally threaded passage 64 in main body portion 34 when head 48 of collet 46 is moved into member 40, passage 64 in turn communicating with an enlarged passage 68 in the normally rearmost portion of main body 34 and presenting an opening 70 at the rear end of arbor 10.

An expander broadly designated 72 has a rod portion 74 which is telescoped within expandible collet 46 and main body portion 34, with bore 60 and passage 64 respectively receiving the same. The innermost end of rod portion 74 is externally threaded in a manner to complementally engage the threads of passage 64. A frusto-conical head 78 integral with the outer end of rod portion 74 is disposed within conical segment 62 to expand sections 56 relative to element 54 and thereby head 48 as expander 72 is reciprocated inwardly into arbor 10.

Polygonal socket 80 in head 78 facilitates rotation of the latter and thereby rod portion 74 with a suitable tool such as an Allen wrench or the like.

In operation, sleeve 24 is initially telescoped within spindle 14 after placement of nut 28 on the outer threaded end 20 of spindle 14 whereby flange 26 of sleeve 24 moves into proximal relationship to the outer edge of spindle 14 and the tapered outer surface of sleeve 24 firmly engages surface 22 of spindle 14. Next, main body portion of arbor 10 is telescoped within sleeve 24 and tubular spindle 14, with main body portion 34 being pushed inwardly until conical surface 42 of member 40 firmly engages the conical surface 30 of sleeve 24, drawbar 38 being threaded onto portion 36 of main body portion 34 to maintain arbor 10 in a fixed position relative to spindle 14.

Expandible collet 46 is next moved into a position with the head 48 thereof received within conical recess 44, with keyway 52 receiving key 50. The workpiece is placed over sections 56 and expander 72 telescoped within bore 60 and passage 64 and then screwed into the threads therein until head 78 engaging the inner conical segment 62 spreads sections 56 into firm engagement with the workpiece within the aperture therein.

It can be recognized that in lieu of the procedure described above, arbor 10 may be placed within sleeve 24 and tubular spindle 14 in an assembled condition, and it only being necessary to rotate expander 72 to force sections 56 outwardly into engagement with the workpiece.

Inasmuch as surface 22 assures correct coaxial alignment of sleeve 24 with tubular spindle 14, it can be recognized that the tapered, interengaged surfaces of arbor 10 and sleeve 24 provide perfect concentric alignment of the aperture in the workpiece with the axis of spindle 14. Furthermore, the outer exposed, circular surface of member 40 presents a face for aligning the workpiece perpendicularly with respect to the axis of spindle 14.

Another form of arbor embodying the principles of the invention includes a collet 146 adapted to be connected to a main arbor portion such as 34, with the frusto-conical head portion 148 thereof adapted to be received within the conical member 40 of such main body portion 34 in exactly the same manner as collet 46 is attached to the same. Collet 146 differs from expandible collet 46 only in that the outer semicylindrical surfaces 182 of each of the individual sections 156 separated by circumferentially spaced, radially extending slots 158, are serrated to assure firm interconnection between sections 156 and the workpiece within the aperture therethrough. Collet 146 operates the same as collet 46 with an expander (not shown) employed to move sections 156 radially of the axis of collet 146 in order to move serrated surfaces 182 into contacting relationship to the workpiece.

A third type of arbor embodying certain of the principles of the invention is designated broadly by the numeral 210 and is illustrated in detail in Figs. 5 to 7 inclusive. Arbor 210 is also adapted to be mounted on a machine tool 12 but in order to more clearly indicate the manner in which the arbors of the instant invention are adapted for mounting on a collet chuck attachment, an attachment 222 is shown in Fig. 5 with arbor 210 mounted on the same.

Chuck attachment 222 has a main circular section 212 provided with a forwardly extending, tubular boss 214 which in turn mounts a sleeve 216 having a cylindrical inner passage 218 communicating with an outer conical surface 220.

An annular mounting plate 224 joined to the normally rear face of section 212 also serves as means for rotatably maintaining an annular hand wheel 226 disposed between section 212 and plate 224, with the inner peripheral edge 228 of wheel 226 being provided with teeth meshing with a spur gear 230 rotatably carried by pin 232 mounted on section 212 and plate 224. Another, somewhat smaller spur gear 234 joined to pin 232 for rotation therewith intermeshes with the outer teeth 236 of an internally threaded collar 238.

Mounting plate 224 on attachment 222 adapts the same for mounting on a machine tool 12 of the type having an annular mount 240 integral with and of greater diameter than the spindle 242 of machine tool 12. Annular alignment head 241 integral with mount 240 and projecting forwardly therefrom is adapted to be received within a complemental recess 244 in plate 224 whereby attachment 222 is maintained in exact coaxial alignment with spindle 242. Fasteners 245 carried by plate 224 and removably connected to mount 240 in suitable passages therefor, releasably secure attachment 222 to spindle 242 for rotation therewith.

Arbor 210 is telescoped within chuck attachment 222, with the main cylindrical body portion 246 received within passage 218 of sleeve 216 and passing through tubular collar 238. The normally innermost end of main body portion 246 is externally threaded as at 248 in a manner to threadably engage the internal threads of collar 238.

Arbor 210 also has an outer, substantially frusto-conical head portion 250 integral with main body portion 246 and having an outer conical surface 251 complementally engageable with conical surface 220 of sleeve 216.

An expandible collet portion broadly designated 252 extends outwardly from head portion 250 in substantially axial alignment therewith and includes an inner element 254 integral with head portion 250 and having a number of circumferentially spaced, radially projecting, semi-cylindrical sections 256 integral therewith.

Sections 256 are separated by radially extending slots 258 and are identical with sections 56 of arbor 10 except that the same have a smaller diameter. It can be recognized, however, that sections 256 may be constructed of any desired radius and it is preferable to provide a number of arbors 210 having collet portions 252 of different diameters to accommodate workpieces having apertures therein of various sizes.

Central passage 260 in main body portion 246 and communicating with enlarged bore 262 in the normally innermost end of main body portion 246, is threaded in a manner to receive the threaded end 264 of an elongated expander broadly numerated 266, having a rod portion 268 telescoped within passage 260 and bore 270 in element 254. As clearly shown in Fig. 5, bore 270 is in axial alignment with passage 260 and communicates with a frusto-conical segment 272 in element 254 and sections 256 presenting a conical recess. Frusto-conical head 274 integral with rod portion 268 is normally received within conical segment 272 in order to expand sections 256 relative to element 254 as expander 266 is reciprocated in passage 260 and bore 270. A polygonal socket 276 in the outer face of head 274 facilitates rotation of expander 266 with an Allen wrench or the like.

In operation, it is to be understood that chuck attachment 222 is initially secured to mount 240 of spindle 14, whereupon arbor 210 is telescoped within sleeve 216 until the inner threaded end 248 of main body portion 246 moves into engagement with the internal threads of collar 238. Thereupon, hand wheel 226 is rotated in a direction to turn spur gear 230 as well as gear 234 which rotates collar 238, thereby threading the latter onto end 248 of main body portion 246 and pulling arbor 210 into chuck attachment 222 until conical surface 251 of head portion 250 complementally engages surface 20 of sleeve 216.

It is assumed that expander 266 is positioned within passage 260 and bore 270 and therefore, upon placement of a workpiece on collet 252 with sections 256 disposed within the aperture therein rotation of expander 266 with an Allen wrench disposed within polygonal recess 276 causes sections 256 to be moved outwardly as they are cammed radially by head 274 until the outer cylindrical surfaces of such sections engage the workpiece to hold the same in firm axial alignment with spindle 14.

It is to be emphasized that the expandible collet arbor of the instant invention is of particular advantage because of the tapered surfaces thereon interengageable with conical surfaces on the chuck attachment to assure precision alignment of the aperture in the workpiece with the axis of the machine tool.

This is a continuation-in-part of my application Serial No. 655,248, filed April 26, 1957 and now abandoned.

Having thus described the invention what is claimed as new and desired to be secured by Letters Patent is:

1. In a machine tool provided with a rotatable spindle and a chuck mounted on the spindle having a central bore therethrough including an outer, conical end portion concentric with the axis of the spindle, the combination with said chuck of an arbor including an elongated main body portion telescoped within said bore and having a conical outer face portion complementally engaging the inner surface of the chuck defining said conical end portion of the bore, said main body portion being provided with a longitudinally extending centrally passage threaded throughout at least a selected length thereof; a collet portion joined to said main body portion, projecting outwardly therefrom beyond the chuck and provided with an outer cylindrical surface adapted to engage a workpiece within an opening therein, said collet having a bore coaxial with said passage terminating in an outer, conical bore segment and a number of circumferentially spaced, radial slots defining expansible sections therebetween; and an expander telescoped within said arbor including an elongated rod portion in threaded engagement with said inner threaded length of the passage and a conical head integral with said rod portion complementally engaging the surface of the arbor presenting said conical segment whereby upon reciprocation of the expander relative to the arbor, the effective diameter of the outer cylindrical surface of the collet portion is varied.

2. A combination as set forth in claim 1 wherein said collet portion is integral with the main body portion.

3. A combination as set forth in claim 1 wherein said main body portion has an internal, conical recess in the normally outermost end thereof and coaxial with said bore through the same, said collet being provided with a conical head in spaced relationship to said cylindrical surface thereon and complementally engaging the surface of the main body defining said recess, the expander maintaining said head in releasable engagement with said main body portion.

4. A combination as set forth in claim 1 wherein a length of the outer surface of said main body portion is externally threaded adapting the same to be threadably joined to the spindle or the chuck.

5. A combination as set forth in claim 1 wherein said outer cylindrical surface of the collet portion is serrated to assure firm joinder of the workpiece to the arbor.

6. A combination as set forth in claim 3 wherein said main body portion is provided with a key extending into said recess and said head has a keyway therein slidably receiving said key whereby relative rotation between the main body portion and the collet is prevented.

References Cited in the file of this patent
UNITED STATES PATENTS

| | | |
|---|---|---|
| 2,435,480 | Tuttle | Feb. 3, 1948 |
| 2,494,899 | Ross | Jan. 17, 1950 |
| 2,829,897 | Parker | Apr. 8, 1958 |
| 2,851,274 | Greer | Sept. 9, 1958 |